June 7, 1932.  C. V. FOULDS  1,861,848
HYDRAULIC VALVE SYSTEM
Original Filed Aug. 22, 1927
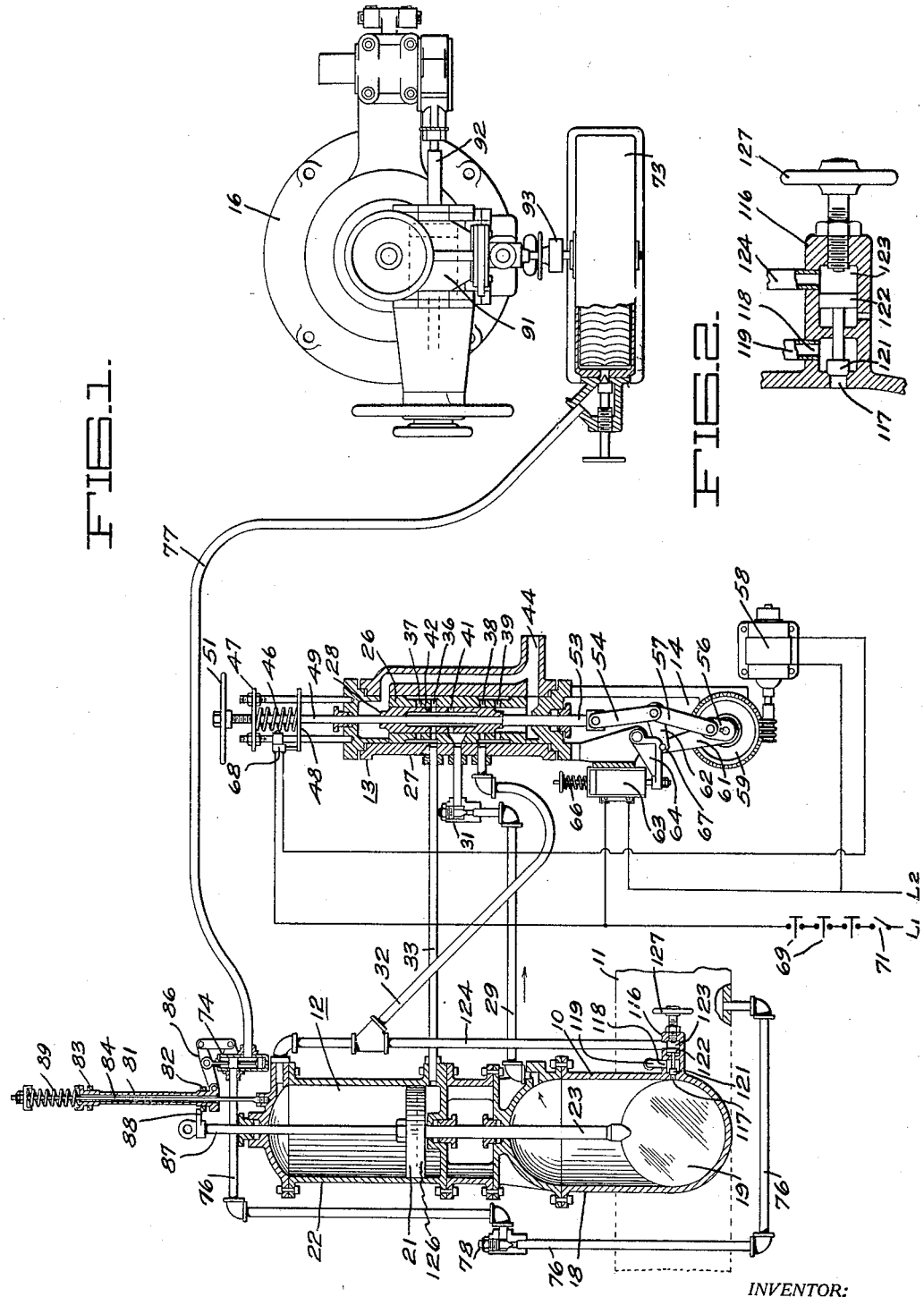
INVENTOR:
*Charles V. Foulds*
BY
*White, Prost & Fryer*
ATTORNEYS.

Patented June 7, 1932

1,861,848

UNITED STATES PATENT OFFICE

CHARLES V. FOULDS, OF BERKELEY, CALIFORNIA, ASSIGNOR TO THE PELTON WATER WHEEL COMPANY, OF SAN FRANCISCO, CALIFORNIA, A CORPORATION OF CALIFORNIA

HYDRAULIC VALVE SYSTEM

Original application filed August 22, 1927, Serial No. 214,548. Divided and this application filed March 12, 1929. Serial No. 346,473.

This invention relates generally to valve systems for controlling hydraulic flow, and is a division of my copending application No. 214,548 filed August 22, 1927, for hydraulic control system.

It is a general object of this invention to devise a hydraulic valve in combination with a novel form of automatically controlled bypass.

It is a further object of this invention to devise novel means for controlling a bypass about a hydraulic valve, which will serve to automatically open the bypass for a substantial time prior to opening of the valve, and which will automatically close the bypass upon return of the valve to complete closed position.

It is a further object of this invention to devise a hydraulic valve system comprising a valve actuated by a hydraulic pressure chamber, the system utilizing the varying pressures within the pressure chamber for controlling a bypass about the valve.

It is a further object of this invention to devise a valve system particularly adapted for use in connection with hydraulic turbine installations, such as shown in copending application No. 214,548.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a side elevational view showing diagrammatically a system incorporating my invention, certain parts being shown in cross section.

Fig. 2 is a detail cross sectional view showing the bypass valve.

The system of this invention can be outlined briefly as comprising a main valve for controlling hydraulic flow, the movable valve member of which is actuated by suitable means such as a hydraulic piston. Movement of the hydraulic piston is in turn controlled by suitable means such as an auxiliary control valve. When the valve is utilized in a hydraulic turbine system, the outflow side of the valve is connected to the turbine while the inflow side is connected to the penstock. For equalizing pressures upon the main valve, I utilize a bypass which is automatically opened and closed according to movement of the main valve. Preferably the bypass is caused to open a substantial period prior to opening of the main valve so as to completely fill the outflow side of the conduit with water prior to opening of the main valve. Likewise during normal closing movement of the main valve in still water, the bypass remains open until the main valve is completely closed.

In that embodiment of the invention illustrated in the drawing there is shown a main valve 10 of the sliding gate type having its inflow side connected with a source of water under pressure, as for example a penstock pipe, and having its outflow side connected with a pipe 11 which leads to a hydraulic turbine. The main valve is adapted to be actuated by hydraulic mechanism designated generally at 12, and admission of fluid to this mechanism is controlled by means of an auxiliary valve 13. For actuating valve 13 there is provided a suitable mechanism 14 which serves to move control valve 13 into either one of two positions. Associated with the hydraulic mechanism 12 and control valve 13, there is a suitable turbine governor indicated generally at 16 which serves to control a mechanism.

The main valve 10 may consist for example of a valve housing 18 within which is disposed the sliding valve gate 19. The hydraulic actuating mechanism 12 for simplicity has been shown as comprising a double acting piston 21 operatively disposed within a cylinder 22, piston 21 being secured to the extended actuating rod 23 of valve 10. In that position of the cylinder 21 and valve shown in the drawing, pressure applied to the upper side of piston 21 serves to close valve 10, while pressure applied to the under side serves to open the valve.

The auxiliary valve 13 may be similar to the control valve shown and described in a copending application assigned to the same assignee as this application, said application bearing Serial No. 204,997 filed in the joint names of Foulds and Orton, or it may be of a somewhat similar construction arranged as shown in Fig. 1. It may be briefly described as including a ported sleeve 26 fixedly disposed within a valve housing 27. Fitted within the sleeve 26, there is a cooperating movable valve member 28. The control valve 13 communicates with a suitable source of liquid under pressure and depending upon the position of valve member 28 functions to admit liquid under pressure to the upper side of piston 21 while exhausting liquid from the lower side, or in the other position of control valve 13, to admit liquid under pressure to the lower side of piston 21 while exhausting liquid from the other side.

As a convenient source of liquid for supplying to the cylinder 22, I preferably provide a pipe connection 29 between control valve 13, and the housing 18 of the valve 10, whereby pipe 29 connects to the inflow or pressure side of valve 10. Admission of liquid into the pipe 29 is preferably capable of being controlled by an operator, and for this purpose I have shown an adjustable throttle valve 31. The upper side of cylinder 22 is connected to valve 13 by means of pipe 32, while the lower side of cylinder 22 is connected by means of another pipe 33. For the sake of completeness it may be explained that the control valve illustrated utilizes two sets of ports 36 and 37 in sleeve 26, which are in communication with pipe 33. Likewise two sets of ports 38 and 39 are in communication with pipe 32. The valve member 28 is hollow and is provided with two cooperating sets of ports 41 and 42. When valve member 28 has been moved to one limit of its movement, as shown in the drawing, pipe 29 is in communication with pipe 33 thru ports 41, and registering ports 42 and 36. The ends of sleeve 26 are in communication with a common exhaust passage 44, and with the valve member 28 in the above position, pipe 32 is placed in communication with the exhaust passage thru ports 39. Similarly when valve member 28 is moved to its lower limit, pipe 33 is placed in communication with exhaust passage 44, and communication is established between pipes 29 and 32.

Valve member 28 is preferably biased to its lower position, or closing position for the main valve 10. For this purpose I have shown a compression spring 46 having its one end bearing upon a member 47 fixed with respect to the control valve housing 27, and having its other end pressing against a member 48, this latter member being carried by a rod 49 which is extended from and secured to the valve member 28. For optional manual operation of the control valve, the end of rod 49 may be provided with a threaded portion to receive an internally threaded hand wheel 51. By screwing down this hand wheel the valve member 28 may be shifted to the upper limit of its movement.

Instead of operating control valve 13 manually, it is preferably operated by motive means so as to permit control from a remote point. The particular mechanism shown operates satisfactorily although a variety of mechanism may be substituted. As illustrated it comprises a collapsible linkage which is operated by an electrical motor to move valve members 28 against the pressure of spring 46, and is provided with an electrical solenoid which serves to collapse the linkage when it is desired to permit control valve 13 to move to closing position. Thus a movable actuating rod 53 has been extended from valve member 28, and has pivotally connected to it the link 54. A motor operated crank 56 is pivotally connected to link 54 thru another link 57. As a means for driving crank 56 I have shown an electrical motor 58 operatively connected to crank 56 as by means of reduction gearing 59. Pivotally mounted upon the shaft of crank 56, there is an arm 61 which has its upper end pivotally connected to the upper end of link 57 as by means of another link 62. Mounted stationary with respect to the control valve 13, there is a solenoid or other magnetic device 63 adapted to control a pivotally mounted trigger 64. Solenoid 63 is biased as by means of spring 66 so that when deenergized it swings trigger 64 into disengaging position with a pin 67 secured to arm 61. However when solenoid 63 is energized, trigger 64 is swung into position to engage pin 67 and to prevent rotation of an arm 61 in a clockwise direction.

The electrical circuit for energizing motor 58 and solenoid 63 may include for example the current supply lines $L_1$ and $L_2$, which are connected to motor 58 thru a suitable limiting switch 68. Solenoid 63 is also connected across the current supply lines in series with any number of electrical devices adapted to open the energizing circuit to solenoid 63 in response to an abnormal operating condition. To indicate the operation of such devices, I have shown a plurality of relay switches 69 connected in series with current supply line $L_1$. A manually operated series switch 71 may also be provided.

In operating the control valve 13 so as to open the gate valve 10, the energizing circuit for motor 58 is closed so as to rotate crank 56 in a counterclockwise direction. Links 54 and 57 are then straightened out and pin 67 is swung into locking engagement with trigger 64, since the solenoid 63 is also energized at this time. When crank 56 swings upwardly links 54 and 57 cannot collapse because of the engagement of pin 67, so that they force the valve member 28 upwardly. When crank 56 approaches the top of its stroke, motor 58 is deenergized by engagement of member 48 with limiting switch 68. The valve however will remain in this position until opening of any one of devices 69 in response to an abnormal condition of the turbine or of the generator which the turbine is driving, or until the energizing circuit is opened by the manual switch 71. In the event that the energizing circuit is deenergized, solenoid 63 causes trigger 64 to release the pin 67, thus permitting links 54 and 57 to collapse and to permit valve member 28 to return to original position.

The governor of the turbine installation which I have shown is of the type which employs a motive element for maintaining a fluid pressure, and which controls the admission of this pressure to a hydraulic cylinder in accordance with the speed of the turbine. The hydraulic cylinder in turn opens or closes the nozzle valves or other water regulating devices of the turbine. Governors of this kind are well known in the art and need not be described in detail in this application. The particular governor shown utilizes a small turbine 73 as a motive element for operating a liquid pump which is incorporated in the governor. Turbine 73 is supplied with water from a suitable means such as a valve 74. As a source of pressure water may be taken from the conduit which main valve 10 is controlling, as by means of pipe 76 which connects between the outflow side of valve 10 and valve 74, and valve 74 is connected with turbine 73 thru pipe 77. A suitable throttle valve 78 may be inserted in pipe 76.

The valve 74 controlling admission of water to the governor turbine 73 is controlled by movements of the main gate valve. To accomplish this result I have shown a sleeve 81 having adjustable collars 82 and 83 threaded upon its end portions. Mounted upon the head of cylinder 22 there is a rod 84 upon which sleeve 81 is slidably disposed. The movable valve member of valve 74 is operatively connected to an arm 86 which in turn is connected to the sleeve 81. Secured to the hydraulic piston 21 and extending thru the head of cylinder 22, there is a piston rod 87 which carries an engaging member 88. When piston 21 approaches the upper limit of its movement, member 88 engages collar 83 and moves sleeve 81 upwardly to actuate valve 74 to establish communication between pipes 76 and 77, thus supplying water under pressure to the governor turbine 73. To insure closing of valve 74 when the piston 21 is started downwardly to close the main valve, sleeve 81 is biased toward closing position as by means of compression spring 89. Water is not supplied to the governor turbine 73 until the gate valve has moved to full open position and is automatically shut off when the gate valve is moved toward closed position.

As has been previously explained the governor turbine 73 operates a pump which builds up pressure to actuate a hydraulic piston and cylinder mechanism. Admission of liquid to this hydraulic mechanism is controlled by the speed of the turbine. Therefore it is necessary for the governor turbine 73 to be initiated into operation in order to condition the governor to start the turbine. In Fig. 1 the hydraulic system of the governor has been indicated generally at 91 and serves to actuate a rod 92. Pulley wheel 93 of the governor is connected to the turbine as by means of a belt.

As has been explained in application 204,997, it is desirable to equalize the pressures upon the gate valve 10 while it is being opened or closed. Otherwise excessive wear or water hammer would occur and the valve would have a comparatively short life. For this purpose I provide a bypass about the valve 10 so that the conduit between this valve and the turbine nozzle may be filled with liquid before opening of the gate valve, and may be kept filled until the gate valve is again completely closed. In this invention I control this bypass automatically so that it completely fills the pipe connection to the outflow side of valve 10 before this valve is opened, and does not again close until after the valve has been completely closed.

It is obvious that automatic control of the bypass may be obtained a number of different ways, as by means of a direct mechanical connection between the valve operating rod 23 and a valve for controlling the bypass, or by means of an electrically operated valve controlled by contacts which may be closed by movement of rod 23. One simple and effective way which I have devised for effecting this automatic control, consists of a valve 116, adapted to be actuated by fluid pressure. This valve is provided with one passage 117 which is in communication with the inflow side of valve 10, and with another passage 118 connected to pipe 119 which leads to the outflow side of valve 10. The movable valve member 121 is connected to a differential area piston 122, adapted to move the valve member 121 to closed position by fluid pressure applied to chamber 123. Communication is established between chamber 123 and the upper portion of hydraulic cylinder 22, as by means of pipe 124.

When the upper portion of hydraulic cylinder 22 is being exhausted thru the control valve 13, as when the main valve 10 is being opened or is in open position, the pressure in chamber 123 will be insufficient to keep the valve member 121 closed against the pressure upon the inflow side of the valve, so that the bypass will be open at such times. Likewise when the piston 21 is being moved downwardly in closing the gate valve 10, throttling of the fluid thru valve 31, prevents the pressure in the upper portion of hydraulic cylinder 22 from increasing to a value sufficient to close the bypass valve 116. However when piston 21 has reached its lower limit corresponding to complete closing of the gate valve, the pressure in the upper part of cylinder 22 will at once rise to a sufficiently high value to close valve 116 and thus prevent further bypassing of liquid.

In order to cause the bypass to open and completely fill the outflow pipe section prior to opening of valve 10 I may utilize any one of a number of expedients for retarding opening of the main valve subsequent to initial operation of control valve 13. One way to accomplish this result is explained in application No. 204,997, mentioned above, which utilizes the pressure upon the outflow side of valve 10 for moving piston 21 to open position. Another possible solution is to utilize pneumatic or mechanical time retarding devices for preventing movement of the main gate valve until the bypass has been open sufficiently long to fill the outflow pipe section. The arrangement which I have illustrated in the drawing consists in throttling the pipe 29 by means of valve 31, and providing sufficient entrained air below piston 21 so that an operating pressure will not build up below piston 21 for a substantial period after moving the control valve 13.

Generally it is not necessary to provide positive means for providing such air pockets, although I may provide an air pocket 126 upon the under side of piston 21. In practice an operator regulates throttle valve 31 so as to insure complete filling of the outflow pipe section before piston 21 is moved to crack the valve gate 19. For optional manual operation of the bypass valve 116, I have shown a hand wheel 127 having a threaded stem which may be screwed against the piston 122.

The operation of the complete system is as follows: When it is desired to start a turbine controlled by a system such as described above, the operator closes the electrical circuit connected to lines $L_1$ and $L_2$ whereby motor 58 is energized to move control valve 13 to open position. Pipes 32 and 124 are then permitted to exhaust thru passage 44 of control valve, and bypass valve 116 immediately opens to permit flow of water about the main valve 10. After a lapse of time sufficient to permit complete filling of the pipe section between the main valve and the turbine, pressure below the piston 21 has built up sufficiently to move the main valve toward open position. As piston 21 approaches the upper limit of its movement, engagement of member 88 with collar 83 causes opening of valve 74 and thus admits water under pressure to the governor turbine 73. Building of hydraulic pressure in the governor then conditions the governor to start the turbine into operation by opening the turbine nozzle. If an abnormal condition should arise necessitating shutting down of the system, or if it is desired to shut down the system by manual operation, the electrical circuit connected to lines $L_1$ and $L_2$ is opened, either by opening of relay devices 69 or manual switch 71, thus deenergizing solenoid 63 and permitting the collapse of links 54 and 57. Communication is then established between pipes 29 and 32 to admit liquid under pressure above piston 21, while pipe 33 is permitted to exhaust. Piston 21 moves toward closed position at a relatively low rate because of throttling by valve 31. Throttle valve 31 also permits the pressure above piston 21 to remain relatively low while the piston is in motion, so that bypass valve 116 will normally remain open while the gate valve is being closed. When the gate valve is completely closed movement of piston 21 is arrested and pressure above it immediately builds up a value sufficient to actuate bypass valve 116 to closed position. Immediately after piston 21 is started toward closed position, valve 74 is actuated to interrupt supply of water to the governor turbine 73, so that the turbine nozzle is closed prior to closing of the gate valve. In this way it is possible to have equalized pressure upon the gate valve not only during opening of the same but also during closing movements.

It should be noted that during normal closing of the main valve 10, flow of water thru conduit 11 is arrested due to shutting down of the turbine responsive to closing of valve 74. Under such conditions, as explained above, the bypass valve remains open while valve 10 is closing. Under emergency conditions, valve 10 may be automatically closed while water is flowing thru the same. In this event while valve 10 is being closed the pressure on the inflow side will become increasingly greater than the pressure upon the outflow side, thereby causing the pressure above piston 21 to become sufficiently high to cause closing of the bypass valve prior to actual closing of the main valve.

I claim:

1. In a system of the character described, a valve for controlling admission of fluid to an outflow portion of a conduit from an inflow portion, means for by-passing fluid about said valve, means for controlling said valve, and means controlling the bypass means in accordance with operation of the control means and with fluid pressure in the conduit.

2. In a system of the character described, a valve movable to open or closed positions to control hydraulic flow to an outflow conduit from an inlet conduit, means for bypassing flow about said valve, and means operable by hydraulic pressure in the conduit for automatically opening said bypass means for a substantial time period before opening said valve.

3. In a system of the character described, a valve movable to open or closed positions to control flow to an outflow conduit, a bypass about said valve, control means adapted to be actuated for initiating opening or closing of the valve, means for automatically opening said bypass upon actuating said control means, and means for automatically delaying opening movement of the valve.

4. In a system of the character described, a valve movable to open or closed positions to control admission of water to an outflow conduit, a bypass about said valve, control means adapted to be actuated for initiating opening or closing of the valve, means for automatically opening said bypass upon actuating said control means, and for normally maintaining said bypass open until said valve has been subsequently closed.

5. In a hydraulic system of the character described, a valve movable to open or closed positions to control admission of water to an outflow conduit, a bypass about said valve, means for automatically effecting opening of the bypass prior to opening of the valve, and means for automatically effecting normal closing of the bypass upon complete closing of the valve.

6. In a hydraulic system of the character described, a valve movable to open or closed positions to control admission of water to an outflow conduit, a bypass about said valve, hydraulic means for actuating said valve, said means being associated with a pressure source of fluid, and means also cooperatively associated with said source for automatically opening and closing the bypass in accordance with actuation of the hydraulic means for actuating the valve.

7. In a hydraulic system of the character described, a valve movable to open or closed positions to control admission of water to an outflow conduit, a bypass about said valve, hydraulic means for actuating said valve, said means having a pressure chamber associated with a pressure source of fluid for closing the valve, and means also actuated by pressure in said chamber for automatically controlling the bypass.

8. In a hydraulic system of the character described, a main valve movable to open or closed positions to control admission of water to an outflow conduit, a hydraulic chamber for effecting closing movement of the main valve, a bypass about said valve, a valve for controlling said bypass, and means for controlling said bypass valve according to the pressure of fluid in said chamber.

9. In a hydraulic system of the character described, a main valve movable to open or closed positions to control admission of water to an outflow conduit, a hydraulic chamber for effecting closing movement of the main valve, a bypass about said valve, a valve for controlling said bypass, and a pressure chamber for actuating said bypass valve, said pressure chambers being in communication with each other.

10. In a system of the character described, a valve movable to open or closed position to control hydraulic flow from an inlet conduit to an outflow conduit, a bypass about said valve, and means for retarding opening of said main valve until hydraulic pressure in the outflow conduit has been raised to a substantially predetermined value by flow through the bypass.

11. In a system of the character described, a valve movable to open or closed position, bypass means about said valve, means for controlling said valve, and means for automatically initiating controlled operation of the bypass means upon initiation by said control means of movement of said main valve toward either of said positions.

In testimony whereof, I have hereunto set my hand.

CHARLES V. FOULDS.